July 21, 1931.  S. J. BOUGHTON  1,815,033
CHANGE SPEED TRANSMISSION
Filed Dec. 17, 1928  4 Sheets-Sheet 1
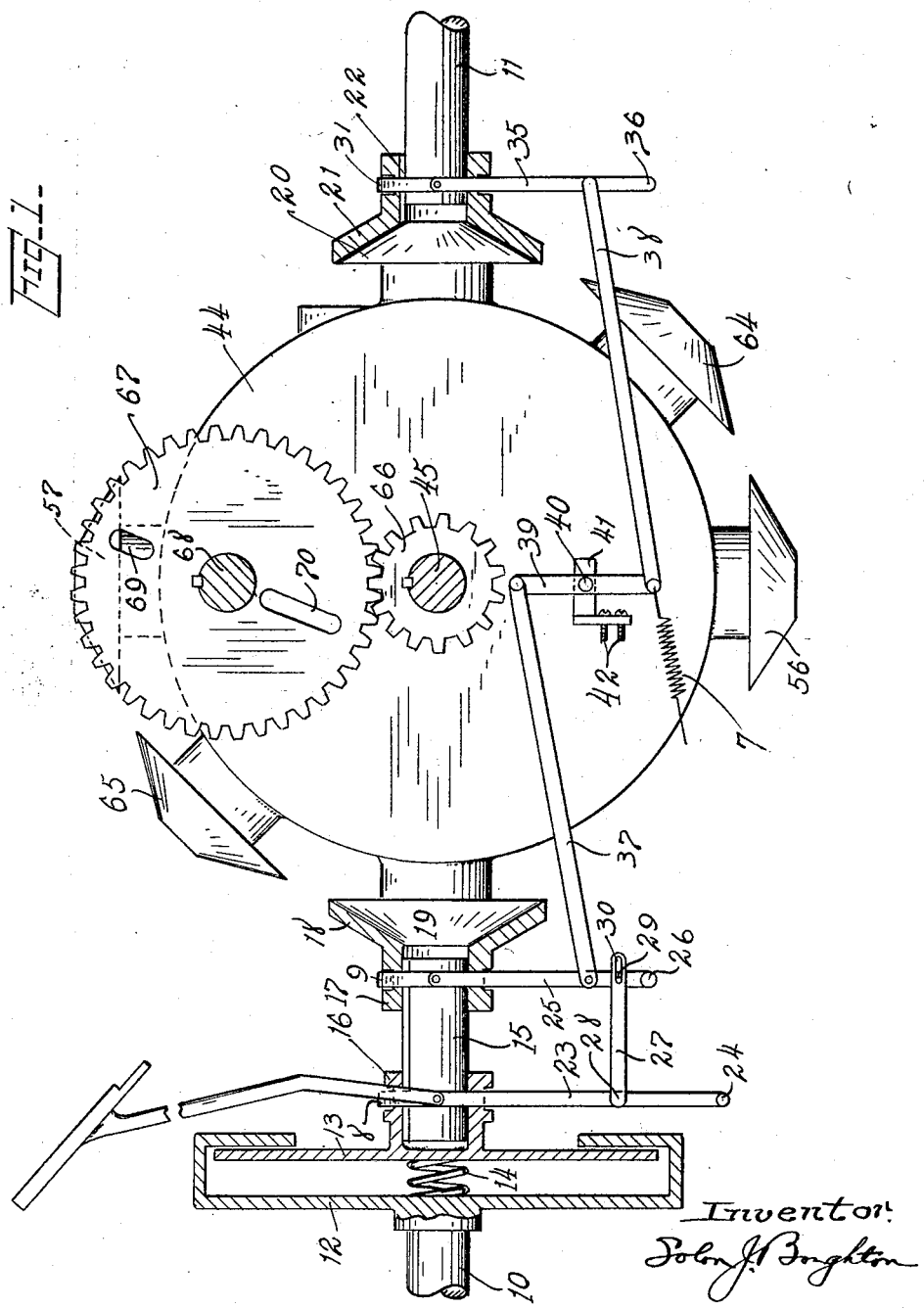

July 21, 1931.  S. J. BOUGHTON  1,815,033
CHANGE SPEED TRANSMISSION
Filed Dec. 17, 1928  4 Sheets-Sheet 2
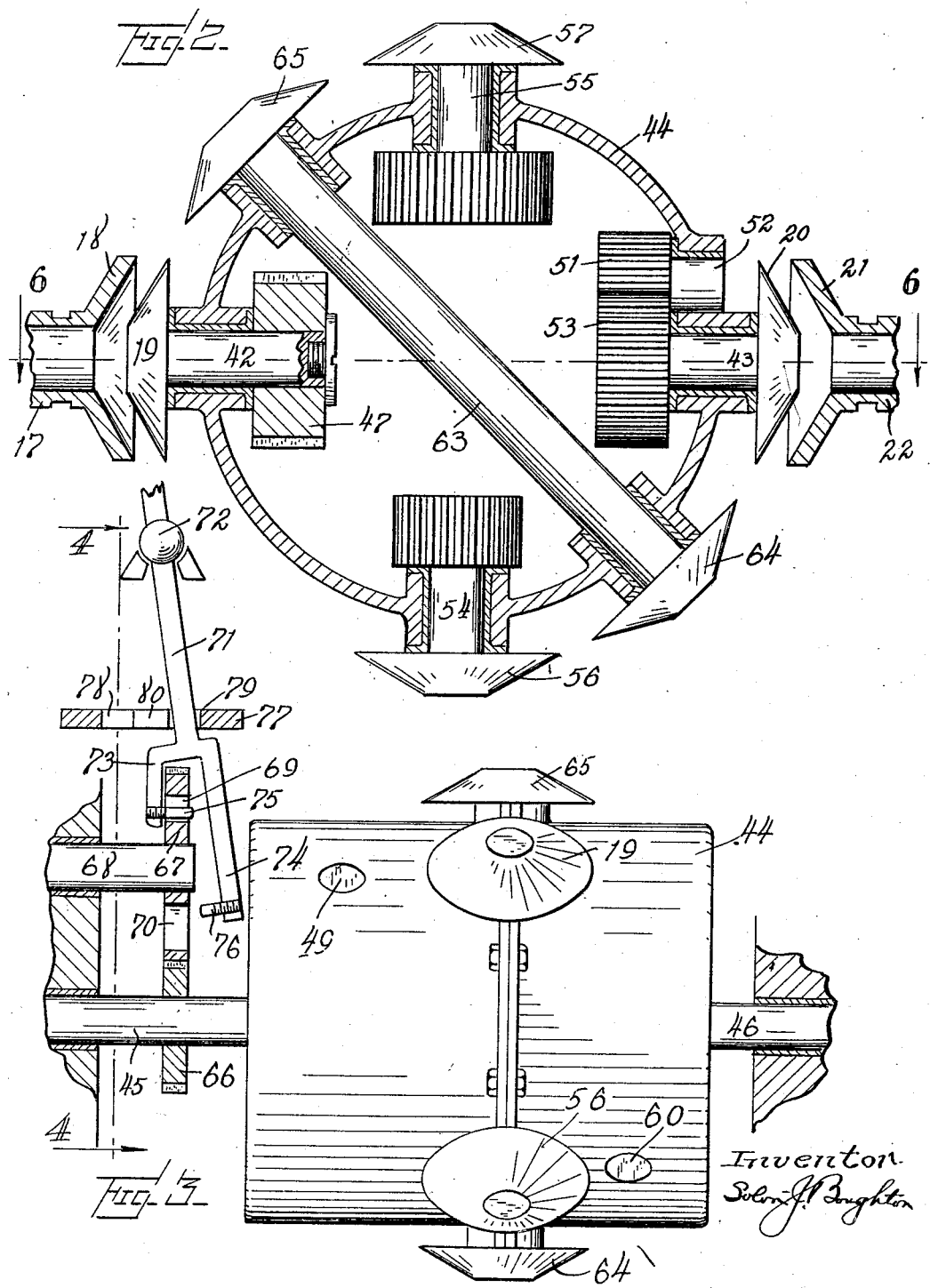

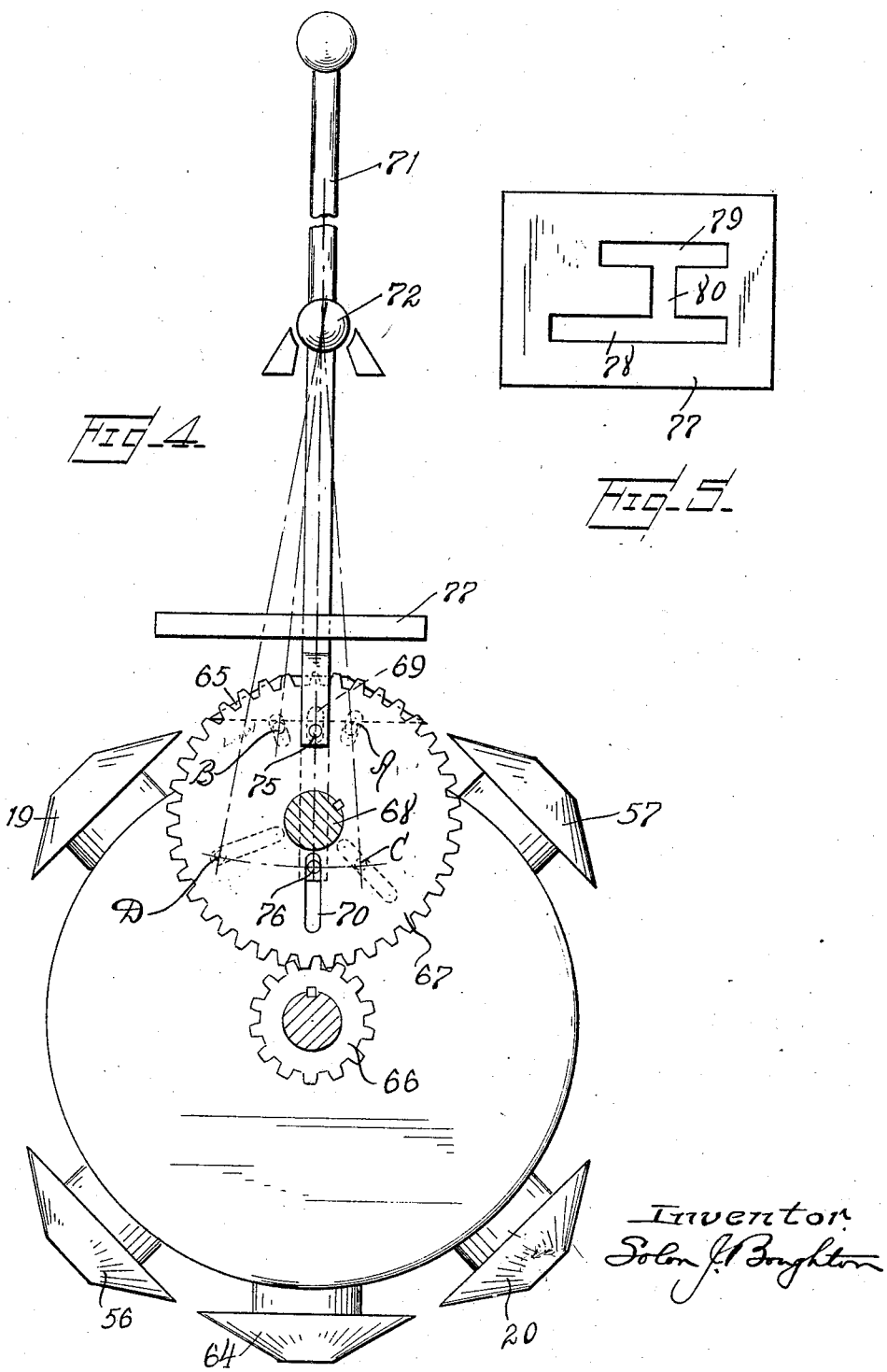

July 21, 1931.  S. J. BOUGHTON  1,815,033
CHANGE SPEED TRANSMISSION
Filed Dec. 17, 1928  4 Sheets-Sheet 4
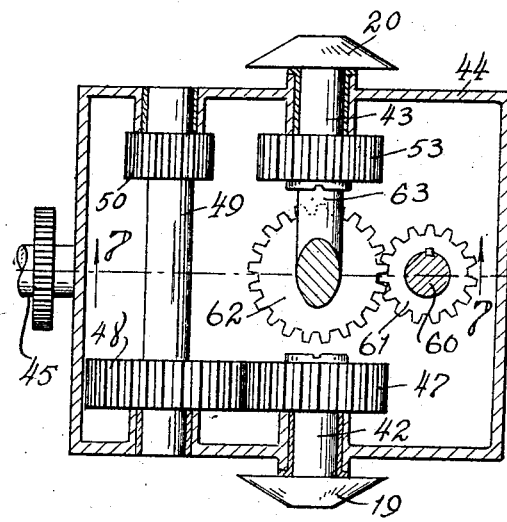
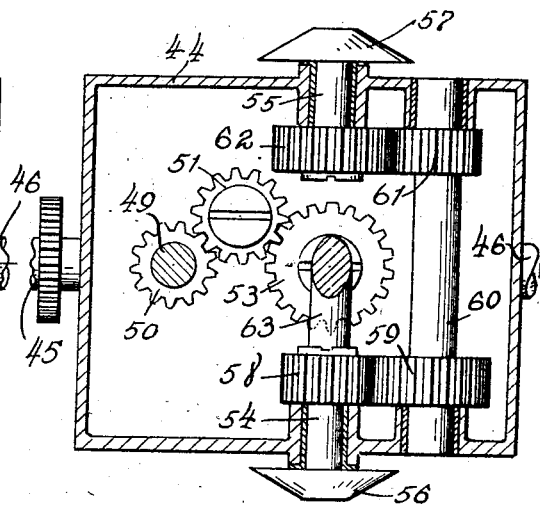
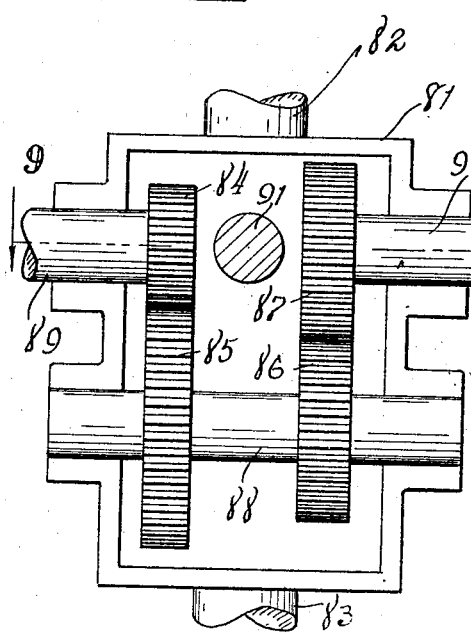
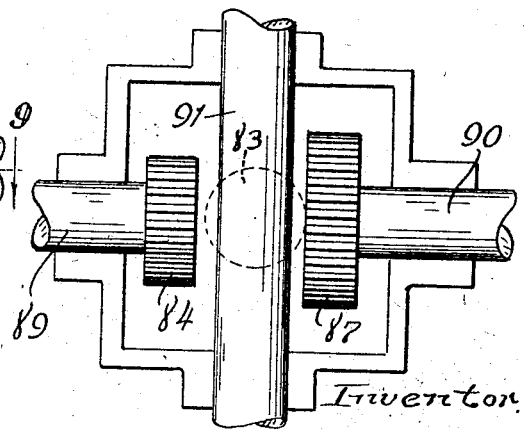
Inventor.
Solon J. Boughton Patented July 21, 1931

1,815,033

UNITED STATES PATENT OFFICE

SOLON J. BOUGHTON, OF SHAKER HEIGHTS, OHIO

CHANGE-SPEED TRANSMISSION

Application filed December 17, 1928. Serial No. 326,639.

This invention relates to improvements in change speed transmissions, being intended primarily for use in automotive vehicles. Some of the broader aspects of the invention are disclosed and claimed in my copending application, Serial No. 313,450 filed October 19, 1928, entitled Change speed gearing.

One of the objects of the invention is the provision of a plurality of independent transmission units, any one of which may be brought into operative or driving position, the various elements of each transmission unit remaining constantly in operative relation thereby permitting speed changes without any possible clashing of gears.

Another object is the provision of control means for connecting and disconnecting the various units to and from the driving and driven shafts of the vehicle, and for shifting the carrier in which the units are mounted so as to bring the desired unit into operative position.

A further object is the provision of a means for shifting the carrier which shall operate like the conventional gear shift commonly employed in automobiles.

Still another object is the provision of means actuated by a single pedal movement for controlling the transmission clutch as well as the coupling or uncoupling of a transmission unit.

Other objects and features of novelty will appear as I proceed with the description of those embodiments of the invention which, for the purposes of the present application, I have illustrated in the accompanying drawings, in which Figure 1 is a view in side elevation disclosing one embodiment of the invention, some of the parts being shown in section and others being illustrated in a more or less diagrammatic manner, the shifting lever being removed for the sake of clearness. In this figure the transmission is illustrated in the reverse gear position.

Fig. 2 is a transverse sectional view taken in the plane of the coupling elements.

Fig. 3 is a rear elevation of the gear carrier, showing the shift lever and shifting gears in vertical cross section, the transmission being set in the neutral position.

Fig. 4 is a view taken partially in section on the line 4—4, Fig. 3.

Fig. 5 is a plane view of an H-guide for the shift lever.

Fig. 6 is a sectional view through the trunnions of the carrier, the view being taken substantially on the line 6—6, Fig. 2, showing the reverse gear train in operative position.

Fig. 7 is a sectional view taken substantially on the line 7—7, Fig. 6, showing the reversible high and low gear train in operative position.

Fig. 8 is a sectional view through a modification, in which the reverse gear train is omitted, and Fig. 9 is a transverse sectional view of the same construction, taken substantially on the line 9—9, of Fig. 8.

In the drawings the engine shaft of the vehicle is indicated at 10, and the propeller shaft at 11. 12 indicates diagrammatically the driving element of a friction clutch, the driven element being indicated at 13. A coil spring 14 tends to hold these elements in frictional engagement. 15 is an intermediate shaft of short length upon which a collar 16 attached to the clutch element is keyed to slide. A second collar 17 is also keyed to slide upon the same shaft 15. The collar 17 carries one element 18 of a separable coupling. This coupling preferably takes the form of complementary conical friction elements. The other element of this coupling, as constituted in Figs. 1 and 2, consists of a head 19 shaped like a frustum of a cone. Diametrically opposite the head 19 is a similar head 20 which is adapted to frictionally engage with a complementary socket element 21 attached to a collar 22 which is keyed to slide upon the propeller shaft 11.

The collars 16 and 17 are grooved circumferentially, as shown, to carry rings 8 and 9, and these rings are provided with trunnions that are pivotally connected respectively to a foot lever 23 pivoted at 24 to some relatively fixed part of the vehicle and an auxiliary lever 25 likewise pivoted at 26 to a fixed part of the vehicle. These two levers are interconnected by a link 27 which is pivoted at 28 to the lever 23 and attached to the lever 25 by a pin and slot connection 29, 30. It will be noted that the distance between the points 24 and 28 is much greater than the distance between the point 26 and the pin 29. Hence the angular movement of the lever 23 is multiplied in the lever 25 after the lost motion of the pin and slot connection is taken up. This lost motion permits sufficient movement of the foot lever 23 to disengage the clutch without transmitting any movement to the lever 25, and therefore without disturbing the engagement of the coupling elements 18 and 19. The collar 22 is grooved to receive a ring 31 which is similar to the rings 8 and 9 previously mentioned. Suitable operative connections are provided so that the movements of the rings 9 and 31 shall always be equal and in opposition to each other. To this end the ring 31 may be pivotally connected with a lever 35 which in turn is pivotally connected at 36 to a stationary part of the vehicle. The levers 25 and 35 may be connected by links 37 and 38 with opposite ends of an intermediate lever 39 pivoted at 40 to a bracket 41 which is attached to the vehicle frame or other relatively fixed part by means of screws 42. Any suitable spring means, such as that diagrammatically illustrated at 7 in Fig. 1, may be employed for causing the two socket members 18 and 21 to move inwardly into engaging position, the opposite movement being effected by the foot lever 23 working in opposition to the spring 7. In order to make the friction couplings effective, it is necessary to have their elements engage under considerable end pressure, which necessarily produces rather heavy end thrust. In my mechanism, however, there are two end thrusts working equally and oppositely upon the carrier 44 for each of the change speed trains, while in the case of direct drive, which is used most of the time, these end thrusts are absorbed entirely in the solid shaft 63 hereinafter referred to. From this description it will be obvious that when the lever 25 is swung upon its pivot 26 the lever 35 is swung a like amount but in an opposite direction. In the present disclosure the two opposite couplings 18, 19 and 20, 21 are caused to become effective at the same time, but this is not essential, and under some conditions it may be desirable to have them work progressively.

As shown in Fig. 2, the conical heads 19 and 20 are mounted upon and fixed to the outer ends of a pair of aligned separated shafts 42 and 43 which are mounted in bearings in opposite sides of a carrier 44. The latter may be in the form of an entirely closed casing, as shown, adapted to retain lubricant. This carrier is provided with trunnions 45 and 46, rotatably mounted in suitable fixed supports. These trunnions are arranged upon an axis at right angles to and intersecting the line of centers of the shafts 10, 11 and 15.

Inside the carrier 44 the shaft 42 has mounted thereon a gear 47. This gear meshes with gear 48 fixed to a shaft 49 rotatably mounted in the opposite walls of the carrier 44. Near its opposite end this shaft carries a small gear 50 which meshes with a gear 51 carried upon a stub shaft 52, this latter gear meshing in turn with a gear 53 on the shaft 43. Hence the shafts 42 and 43 are intergeared to turn in opposite directions, and this transmission unit becomes a reverse gear drive. Obviously any other suitable means for transmitting rotation from the shaft 49 to the shaft 43 in the same direction may be substituted for that shown. Ring and pinion gearing and chain and sprocket gearing are well known means for accomplishing this result.

Two other short shafts 54 and 55 are mounted in alignment in the carrier 44 in the same transverse plane as that in which the shafts 42 and 43 are located, the axes of these two pairs of shafts intersecting each other in the axis of the trunnions 45 and 46. The angle between the two pairs of shafts is here illustrated as 90°, but they may be arranged at other angles if desired. On the outer ends of the shafts 54 and 55 are coupling heads 56 and 57 respectively. The shaft 54 carries a gear 58 which meshes with a larger gear 59 on a shaft 60 which extends across the carrier on the side of the plane of the coupling heads which is opposite to the shaft 49. The shaft 60 near its opposite end carries a small gear 61 which meshes with a larger gear 62 on the shaft 55. Hence the shafts 54 and 55 are intergeared in such manner that the shaft 55 must turn more slowly than the shaft 54. Hence when the coupling head 56 is in engagement with the coupling socket element 18 and the head 57 is likewise in engagement with coupling socket element 21 the transmission is in low gear. Now when the carrier is turned upon its trunnions 45, 46 through an angle of 180° and the heads 57 and 56 are caused to engage with the sockets 18 and 21 respectively, the gear ratio is reversed and this transmission train or unit then furnishes high speed transmission. In other words, one position of this combined high and low transmission unit gives a certain reduction from engine speed, and the other position of the unit gives a corresponding increase over engine speed.

In the same plane with the shafts 42, 43, 54 and 55 there is also a continuous shaft 63, on the opposite ends of which are coupling heads 64 and 65. When this shaft is in alignment with the engine and propeller shafts and the coupling elements are in engagement, direct drive is provided. Obviously it is immaterial which one of the coupling heads 64 and 65 is caused to engage the coupling element 18, although the present embodiment of the invention as a matter of convenience contemplates having the head 64 always forward when the transmission is set for direct drive or intermediate speed.

In the broader aspects of the invention, any means whatever may be employed for revolving the gear carrier 44 upon its trunnions, but I consider it desirable that the control means be such as to be operable in the same manner as the conventional automobile gear shift, and to that end I have devised the control mechanism now to be described. 66 is a pinion fixedly mounted upon the trunnion 45. With it meshes a gear 67 or larger diameter rotatable upon a shaft 68 mounted in the frame of the vehicle. The gear 67 is provided with two opposed radial slots 69 and 70. 71 is a control lever, the upper end of which may be identical in appearance and structure with the conventional gear shift lever, and similarly located in an automobile. This lever may be mounted at 72 so as to be capable of swinging movement about that point both crosswise and longitudinally of the vehicle. At its lower end it is bifurcated to form a short leg 73 and a long leg 74 straddling the gear 67, as shown in Fig. 3. The leg 73 carries a pin 75 adapted to enter the slot 69, and the leg 74 carries a similar pin 76 adapted to enter the slot 70.

The lever 71 extends through a guide plate 77 in which there is an H-slot guide comprising a long side slot 78, a short side slot 79, and a transverse connecting slot 80. The H-slot offers a convenient means for limiting the movements of the lever 71 in a forward and backward direction, and therefore limiting the oscillations of the gear 67, but it should be understood that other means for accomplishing this purpose are within the purview of the invention.

In Fig. 4 the lever 71 is shown in neutral position. In this position none of the coupling heads are in alignment with the socket coupling elements 18 and 21. Both of the slots 69 and 70 are in the vertical plane, as is also the lever 71. Hence the lever may be swung crosswise through the slot 80 to cause either one of the pins 75 and 76 to operatively engage the gear 67. Between the extremes of the transverse movement of the lever, its pins 75 and 76 both engage the gear 67, at which time the gear is of course locked against rotational movement, and there is consequently no possibility of movement of the gear carrier 44. A suitable key lock may of course be provided for holding either the lever or one of the gears 66 and 67 in its neutral position.

If the lever 71 be tilted sidewise so as to cause the pin 75 to occupy the slot 69, as indicated in Fig. 3, and if the upper end of the lever is now swung forward causing the lower portion of the lever to move to the rear end of slot 79 of the guide plate, the pin 75 will move to the position marked A in Fig. 4, and the gear 67 will be rotated clockwise a short distance, the smaller gear 66 rotating through a greater angle in the anti-clockwise direction to bring the coupling head 19 into the forward horizontal or operative position. The transmission is now in reverse gear. If the upper end of the lever be pulled directly back, causing the lower part thereof to move to the forward end of slot 79, the pin 75 will move into the position marked B in Fig. 4, rotating the gear 67 in an anti-clockwise direction and the gear 66 in a clockwise direction, thereby bringing the coupling head 56 into horizontal or operative position. This is low gear.

Now assuming that the lever 71 is moved back to neutral and crosswise through the slot 80, and then that the upper end of the lever is shifted forwardly until its lower part moves to the rear end of slot 78 of the guide plate, the pin 76 engaging the slot 70 will move into the position marked C in Fig. 4, shifting the gear 67 in an anti-clockwise direction through an angle which, in the present instance, is twice the angle through which the gear had moved in response to a corresponding movement of the lever when the pin 75 was in operative position. This movement produces a clockwise rotation of the gear 66 through 90° instead of through 45° as before, with the result that the coupling head 64 is brought into horizontal position opposite the coupling element 18. This is direct drive, or second speed. Now if the upper end of the lever is pulled backwardly until the lower part travels to the forward end of slot 78, the pin 76 will move into the position marked D in Fig. 4, revolving the gear 67 in a clockwise direction through 135°, when the coupling head 57 will come into horizontal position opposite the coupling head 18. This is high gear.

The above operations, it will be observed, are identical with those employed in the operation of the ordinary gear shift lever, except that the lever moves through a greater distance when the transmission goes into high. The first effect of pressure upon the foot lever 23 is to release the clutch 12, 13. Up to a certain extent, that is to the extent permitted by the slot 20 in link 27, the operation of the foot lever 23 has no effect different from that of the operation of the conventional clutch pedal in an automobile. However if the pressure is continued the lever 25 is swung upon its pivot 26, and the movement is rapid owing to the short distance between the points 26 and 29. Through the intermediate connections 37, 39 and 38, the lever 35 is swung a like amount in the opposite direction. The coupling elements 18 and 21 are therefore drawn away from the coupling heads with which they had been in contact, and the carrier 44 is then free to turn upon its trunnions. The engaging surfaces of the coupling head and socket elements may be more or less smooth so as to permit some slippage, or they may be made rough or lined with friction material so that their engagement is quite positive. In the latter event the clutch 12, 13 provides the necessary slippage. Under some conditions it may be possible and desirable to omit the clutch 12, 13 entirely, the coupling elements alone then discharging the functions of the slip clutch.

In Figs. 8 and 9 I have illustrated diagrammatically an embodiment of the invention in which the reverse speed train or unit is omitted, thereby greatly simplifying the construction. In these Figures the gear carrier is in the form of a housing 81 rotatably supported upon trunnions 82 and 83. In this case there is but one gear train comprising gears 84, 85, 86 and 87, the gears 85 and 86 being mounted upon a jack shaft 88, while the gears 84 and 87 are secured upon aligned shafts 89 and 90 respectively, the outer ends of which are adapted to be coupled to driving and driven shafts, in any suitable manner, as for instance that disclosed in the embodiment first described. Low gear is obtained by connecting shaft 89 with the motor and shaft 90 with the propeller shaft. High gear is obtained by reversing the carrier 81 on its trunnions 82, 83 and connecting the shaft 90 with the motor and the shaft 89 with the propeller shaft. Intermediate or engine speed is obtained by means of a continuous shaft 91 which passes through the housing 81 at right angles to the shafts 89, 90 between the gears 84 and 87. The distance between the ends of shaft 91 is, of course, the same as that between the outer ends of the two shafts 89 and 90.

This latter form of the invention is susceptible of wide use in stationary and portable machines of various kinds, but it may also find a field of usefulness in vehicles as supplemental to the principal transmission. When interposed between the latter and the rear axles, it will multiply by three all of the speeds provided in the principal transmission. Its usefulness in this connection will be particularly apparent in the case of trucks, where a different range of speeds is desirable when the truck is running light from that used when the truck us heavily loaded. Such an auxiliary transmission would also be of use in order to provide different ranges of speed for hilly country and flat country or for city driving and touring.

Having thus described my invention, I claim:

1. In combination, a gear carrier, a pair of trunnions therefor, a plurality of transmission units mounted in said carrier, each unit comprising interconnected coupling portions arranged in alignment with their common axis intersecting the axis of said trunnions, whereby any two of said units may be caused to exchange places by the rotational adjustment of the carrier upon its trunnions.

2. In combination, a gear carrier, a pair of trunnions therefor, a pair of separated aligned shafts rotatably mounted in opposite sides of said carrier, said shafts being interconnected to turn at different speeds, and a continuous shaft mounted in said carrier extending across the space between said aligned shafts, the outer extremities of said shafts being adapted for connection interchangeably with aligned driving and driven shafts by the movement of the carrier upon its trunnions.

3. In combination, a gear carrier, a pair of trunnions therefor, a plurality of independent transmission units mounted in said carrier, one of said units comprising aligned coupling portions interconnected to turn at different speeds about an axis perpendicular to said trunnions, another of said units comprising a pair of direct connected aligned coupling portions mounted to turn about another axis perpendicular to said trunnions, each unit being so positioned in said carrier as to be brought into a common position by the rotational adjustment of said carrier upon its trunnions.

4. In combination, a gear carrier, a pair of trunnions therefor, two distinct transmission units mounted in said carrier, each of said units comprising aligned coupling portions interconnected to turn at different speeds, the coupling portions of each of said units being positioned in alignment in said carrier at right angles to said trunnions, whereby they are capable of being brought into a common position by the rotational adjustment of said carrier upon its trunnions.

5. In combination, a gear carrier, a pair of trunnions therefor, a plurality of transmission units mounted in said carrier, each unit comprising interconnected coupling portions arranged in alignment with their common axis intersecting the axis of said trunnions, and means for turning said carrier upon its trunnions to bring the coupling portions of any one of said units into a predetermined position, said means being capable of moving one of said units through 180°, whereby the speed ratio of the coupling portions of that unit may be reversed.

6. In combination, a gear carrier, a pair of trunnions therefor, transmission units mounted in said carrier, means for rotating said carrier comprising a shift lever movable backward and forward in two different planes, and means for converting the movements of said lever into oscillations of said carrier at one rate of speed when the lever is in one plane and at a different rate of speed when the lever is in the other plane.

7. In combination, a gear carrier, a pair of trunnions therefor, transmission units mounted in said carrier, means for rotating said carrier comprising a gear concentric with said trunnions and fixed with respect to the carrier, a shift lever, an H-slot guide in which said lever works, and means for converting the movements of said lever into oscillations of said gear, with the oscillations corresponding to given movements of the lever in one side of the H-slot greater than those corresponding to like movements of the lever in the other side of the H-slot.

8. In combination, a gear carrier, a pair of trunnions therefor, transmission units mounted in said carrier, means for rotating said carrier comprising a gear concentric with said trunnions and fixed with respect to the carrier, a second gear operatively connected with said first gear, and a gear shift lever, said lever being adapted to be connected with said second gear upon opposite sides of the axis thereof, selectively.

9. In combination, a gear carrier, a pair of trunnions therefor, two distinct transmission units mounted in said carrier, each of said units comprising aligned coupling portions interconnected to turn at different speeds, all of said coupling portions being bisected by the same plane transverse to said trunnions, and a jack shaft in each of said units one on one side and the other on the other side of said plane.

10. In combination, a gear carrier, a pair of trunnions therefor, transmission units mounted in said carrier, means for rotating said carrier comprising a rotatable member concentric with said trunnions and fixed with respect to the carrier, an oscillatable member operatively connected with said rotatable member, and a shift lever, said lever being adapted to be connected with said oscillatable member upon opposite sides of the axis thereof selectively.

11. In combination, a gear carrier, a pair of trunnions therefor, transmission units mounted in said carrier, means for rotating said carrier comprising a lever movable about its fulcrum backward and forward in two different planes and cross-wise in a third plane, and means operatively connected with said lever when in one of said two first named planes for imparting oscillating motion to said carrier at a given rate, and when in the other of said first named planes for imparting oscillating motion to said carrier at a different rate.

12. In combination, a gear carrier, a pair of trunnions therefor, a change speed transmission unit mounted in said carrier comprising aligned spaced shafts, a gear on each of said shafts, a jack shaft also mounted in said carrier and having gears meshing continuously with said first named gears, and a direct drive shaft mounted in the carrier, said direct drive shaft and said aligned shafts being bisected by a plane at right angles to said trunnions.

13. In mechanism of the class described, a rotatable gear carrier, and means for revolving said carrier to bring it into any one of various angular positions, said means comprising a wheel, a bifurcated lever straddling said wheel mounted to have motion either parallel with or transverse to said wheel, and pin and slot connections between the wheel and the bifurcations of the lever, said connections being engageable one at a time by the transverse movement of the lever outwardly in either direction, whereby movements of the lever parallel to the wheel will rotate the same, or being engageable simultaneously by the transverse movement of the lever to an intermediate position, thereby preventing the rotation of the wheel.

14. In mechanism of the class described, a rotatable gear carrier and means for revolving said carrier to bring it into any one of various angular positions, said means comprising a wheel mounted in a bearing on one side thereof, a bifurcated lever straddling said wheel having a short bifurcation on the bearing side of the wheel and a long bifurcation on the other side, said lever being mounted to have motion either parallel with or transverse to said wheel, and pin and slot connections between the wheel and the bifurcations of the lever on opposite sides of the wheel hub, said connections being engageable one at a time or both together by the transverse movement of the lever.

15. In combination, a gear carrier, a pair of trunnions therefor, transmission units mounted in said carrier, a gear operatively connected with said carrier for turning the latter upon its trunnions, a lever, and cooperating means upon said gear and lever for selectively connecting the gear and lever upon opposite sides of the gear axis, whereby a given swing of the lever may be caused to impart rotation to the carrier through two different angles.

16. In combination, a gear carrier, a pair of trunnions therefor, transmission units mounted in said carrier, a gear operatively connected with said carrier for turning the latter upon its trunnions, a lever, and cooperating means upon said gear and lever adapted by movements of the lever sidewise in one direction or the other to selectively connect the gear and lever upon one or the other side of the gear axis, whereby a given swing of the lever may be caused to impart rotation to the carrier through two different angles.

In testimony whereof, I hereunto affix my signature.

SOLON J. BOUGHTON.